July 3, 1951     M. MARINKOVICH     2,559,081

METHOD FOR PREPARING AND CANNING CABBAGES

Filed June 19, 1948

INVENTOR.
Mary Marinkovich
BY William Cleland
Attorney

Patented July 3, 1951

2,559,081

UNITED STATES PATENT OFFICE 2,559,081

METHOD FOR PREPARING AND CANNING CABBAGES

Mary Marinkovich, Barberton, Ohio

Application June 19, 1948, Serial No. 34,015

2 Claims. (Cl. 99—186)

This invention relates to a method for preparing and canning cabbages, as for subsequent use of the prepared leaves for containing meat or similar filling.

Cabbage leaves canned or otherwise prepared by known methods for the present purposes have been generally unsatisfactory, because cooking the leaves with a filling therein has tended to cause the leaves to become mushy or without sufficient body to contain the filling effectively. As a matter of fact, no suitable method for canning cabbages for such purposes has heretofore been provided.

One object of the invention is to provide an improved method for preparing and canning cabbage leaves particularly for use in wrapping meat or other fillings, wherein the cabbage leaves will be substantially tender and solid, and adapted to withstand subsequent cooking without becoming mushy and thereby losing body.

Other objects of the invention will be manifest from the following brief description and the accompanying drawing.

In carrying out the process, whole cabbages are placed in a suitable vessel and scalded or blanched with boiling water until the cabbage leaves are soft, after which they are separated from the cabbage body and placed in the same or a different vessel containing water, which may be the water used for scalding, to which salt has been added to provide a saturated salt solution or brine. The brine is maintained at lukewarm temperature with the cabbage leaves therein for approximately three days.

Figure 1:
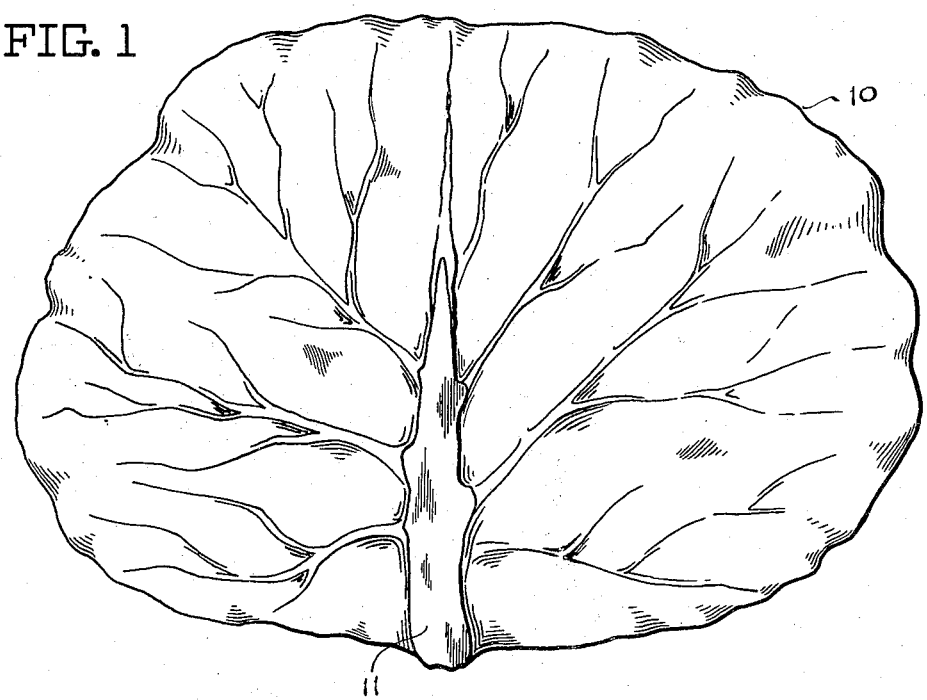
Figure 1 is a top plan view of a cabbage leaf having a portion of the stock cut away in accordance with an intermediate step in the process.
Figure 2:
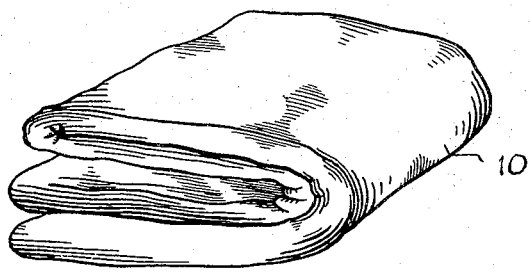
Figure 2 is a perspective view of the cabbage leaf in folded condition in accordance with a subsequent step in the process.

On the fourth day of the soaking process the cabbage leaves 10 are removed from the soaking vessel, and the heavy portions of the stocks are shaved off, as indicated at 11 in Figure 1, to make the leaves of substantially uniform thickness, after which each leaf is folded upon itself several times, substantially as shown in Figure 2, until it is approximately two inches square or of such flat compact size as to be readily received in a preserving can or jar.

Preserving cans (or jars) are filled or substantially filled with the folded leaves 10, and the same juice which was used for the soaking process is then poured over the leaves to cover the same. Next, the cans are processed by any known packing method by which the brine is brought to a boiling point, and by which the cans are vacuum sealed.

The resulting product may be used at any subsequent time as for cooking "pigs in blanket," which are meat fillings wrapped with the cabbage leaves 10 and cooked in any suitable manner. It has been found that the cabbage leaves prepared in the foregoing manner will be substantially solid and yet tender, and when cooked as described will not be soft and mushy and hence will effectively retain the meat filling. The leaves may also be cut up, without cooking, for use in salads.

Modification of the invention may be resorted to without departing from the spirit thereof or the scope of the appended claims.

What is claimed is:

1. A method for preparing cabbage which comprises scalding the cabbage until the leaves thereof are softened, separating the leaves and soaking the same in brine maintained at substantially uniformly warm temperature for several days until the leaves are substantially tender but solid, removing the thickened stock portions of the leaves to render the same more readily foldable, folding the individual leaves upon themselves until they are compact enough to be readily received in a preserving can, packing said folded leaves in preserving cans, adding the brine used for said soaking to the cans, and vacuum sealing said cans.

2. A method for preparing cabbage which comprises scalding the cabbage to soften the leaves thereof, separating the leaves from the cabbage and soaking the same for approximately three days in brine maintained at a substantially uniformly warm temperature until the leaves become tender and substantially solid in consistency, and folding the individual leaves upon themselves until they are of flat compact size adapted to be readily received in a packing can.

MARY MARINKOVICH.

REFERENCES CITED

The following references are of record in the file of this patent:

UNITED STATES PATENTS

| Number | Name | Date |
|---|---|---|
| 30,113 | Baldwin et al. | Sept. 25, 1860 |
| 1,685,511 | Thomas | Sept. 25, 1928 |
| 2,186,003 | Blair | Jan. 9, 1940 |
| 2,322,880 | Pollak | June 29, 1943 |
| 2,390,468 | Schroeder et al. | Dec. 4, 1945 |

FOREIGN PATENTS

| Number | Country | Date |
|---|---|---|
| 496,446 | Great Britain | Nov. 30, 1938 |

OTHER REFERENCES

Farmers' Bulletin 1211, U. S. Dept. of Agriculture, entitled "Home Canning of Fruits and Vegetables," page 45, article entitled "Greens or Potherbs."